United States Patent [19]
Beresniewicz et al.

[11] 4,192,826
[45] Mar. 11, 1980

[54] THERMOSETTING, ELECTROSTATICALLY SPRAYABLE COMPOSITIONS CONTAINING BLOCKED ACID CATALYST

[75] Inventors: Aleksander Beresniewicz, Wilmington, Del.; John P. Gallagher, Philadelphia, Pa.

[73] Assignee: E. I. Du Pont de Nemours and Company, Wilmington, Del.

[21] Appl. No.: 943,363

[22] Filed: Sep. 18, 1978

Related U.S. Application Data

[63] Continuation of Ser. No. 704,365, Jul. 12, 1976, abandoned.

[51] Int. Cl.² .............................................. C08L 67/02
[52] U.S. Cl. .................................... 525/425; 528/108; 528/109; 525/428; 525/430; 525/302; 525/403; 525/523
[58] Field of Search ................................ 260/850, 834

[56] References Cited

U.S. PATENT DOCUMENTS

| | | | |
|---|---|---|---|
| 3,684,565 | 8/1972 | Psencik et al. | 260/850 |
| 3,759,854 | 9/1973 | Chang et al. | 260/21 |
| 3,804,920 | 4/1974 | Cunningham et al. | 260/850 |
| 3,842,021 | 10/1974 | Grant et al. | 260/850 |
| 3,868,338 | 2/1975 | Parsons et al. | 260/15 |
| 4,002,777 | 1/1977 | Juvinall et al. | 427/27 |

FOREIGN PATENT DOCUMENTS 2356768  8/1976  Fed. Rep. of Germany.
1481182  7/1977  United Kingdom.

*Primary Examiner*—Harold D. Anderson

[57] ABSTRACT

Thermosetting liquid coating compositions, based on polymer capable of being crosslinked with nitrogen resin crosslinkers, nitrogen resin crosslinker, and blocked acid catalyst prepared from materials containing at least one oxirane functionality and a sulfonic acid and having a resistivity of at least one megohm are provided. The novel thermosetting coating compositions are particularly useful in electrostatic spraying applications.

4 Claims, No Drawings

THERMOSETTING, ELECTROSTATICALLY SPRAYABLE COMPOSITIONS CONTAINING BLOCKED ACID CATALYST

This is a continuation of application Ser. No. 704,365, filed July 12, 1976, and now abandoned.

BACKGROUND OF THE INVENTION

1. Field of Invention

This invention is related to thermosetting liquid coating compositions and particularly to compositions containing blocked acid catalysts prepared from oxirane-containing materials and sulfonic acids.

2. Description of Prior Art

Coating compositions containing polymers which are capable of being crosslinked, crosslinking agents, and various catalysts facilitating the crosslinking step are well known. The prior art is replete with compositions which contain strong acid catalysts such as para-toluene-sulfonic acid and there also appear references to blocked catalysts.

U.S. Pat. No. 3,868,338, issued Feb. 25, 1975 to T. E. Parsons, et al., discloses thermosetting powder coating compositions based on polyester, cellulose acetate butyrate, crosslinking agent, and a blocked catalyst. Such compositions, however, are not commonly useful as liquid coating compostions.

U.S. Pat. No. 3,846,368, issued Nov. 5, 1974 to P. H. Pettit, Jr., discloses thermosetting powder coating compositions based on soft acrylic polymer, hard acrylic polymer, alkylated melamine formaldehyde resin, dihydroxy-functional plasticizer, and blocked acid catalyst. Such compositions, however, are also not commonly useful as liquid coating compositions.

SUMMARY OF THE INVENTION

According to the present invention there is provided a thermosetting liquid coating composition which is electrostatically sprayable and contains:
(A) film forming constituents consisting essentially of:
 (1) 30–90 parts, by weight of the film formers, of a polymer containing functional groups through which the polymer is capable of being crosslinked with the resin of (2); and
 (2) 70–10 parts, by weight of the film formers, of a nitrogen resin crosslinking agent; and
(B) sufficient blocked acid catalyst to contain 0.05–2 parts, by weight of the film formers, of potentially available sulfonic acid, prepared from materials containing at least one oxirane functionality and a sulfonic acid wherein the oxirane/sulfonic acid equivalent ratio is at least one and the composition having a resistivity of at least one megohm.

Optionally, the coating composition can also contain rheology control agents, pigments, dispersants, adhesion promoters, and other adjuvants.

DESCRIPTION OF THE INVENTION

The thermosetting liquid coating composition of this invention is electrostatically sprayable and contains film forming constituents and blocked acid catalyst.

The film forming constituents comprise at least one polymeric component which has a minimum of two functional groups capable of reacting with a nitrogen resin cross-linking agent. Among such functional groups are included hydroxyl, carboxyl, amine, and amide groups.

Polymers containing such functional groups are well known to those skilled in the coating art and include addition polymers and condensation polymers.

Among the addition polymers are included acrylic and methacrylic homo- and copolymers with other ethylenically unsaturated monomers or mixtures of such monomers wherein among the acrylic and methacrylic monomers are included methyl acrylate, ethyl acrylate, butyl acrylate, cyclohexyl acrylate, 2-ethylhexyl acrylate, acrylonitrile, ethyl methacrylate, butyl methacrylate, cyclohexyl methacrylate, 2-ethylhexyl methacrylate, methacrylonitrile, and the like; homo- and copolymers of ethylenically unsaturated monomers wherein the unsaturated monomer is at least one of styrene, substituted styrenes such as alpha-methylstyrene, ring-substituted styrenes, and the like; vinyl esters such as vinyl acetate, vinyl propionate, and the like; alpha-olefins such as ethylene, propylene, 1-butene, 1-octene, and the like, vinyl chloride, vinylidene chloride; conjugated dienes such as 1,3-butadiene; olefins containing fluorine such as vinyl fluoride, trichlorofluoroethylene, tetrafluoroethylene, hexafluoropropylene; vinyl and allyl ethers; and mono- and di- esters of alpha,beta-ethylenically unsaturated dicarboxylic acids such as mono- and dialkyl maleates, mono- and dialkyl fumarates, mono- and dialkyl itaconates. The choice of these monomers can be dictated by the intended end use of the compositions obtained in this invention as long as the monomer or monomers are capable of homo- and/or copolymerization via free radical initiation.

The necessary functional groups, to provide the crosslinking sites for the nitrogen resin crosslinking agents, are incorporated into the polymer by the inclusion of suitable monomers during the preparation of the polymer or by a post-polymerization reaction. Among such monomers are included hydroxyethyl acrylate, hydroxypropyl acrylate, hydroxyethyl methacrylate, hydroxypropyl methacrylate, acrylic acid, methacrylic acid, itaconic acid, maleic acid, N-tert-butylaminoethyl methacrylate, acrylamide, methacrylamide and the like or mixtures thereof. An example of a post-polymerization reaction is the hydroxy-methylation of an amide-containing polymer.

Among the condensation polymers that can be utilized in this invention are polyesters, fatty acid modified polyesters and polyethers well known to those skilled in the art. The diols utilized in preparing the polyesters can be aliphatic or aromatic. Suitable diols include: ethylene glycol; propylene-1,2-glycol; propylene-1,3-glycol; butylene-1,2-diol; butylene-1,3-diol; butylene-1,4-diol; butylene-2,3-diol; neopentylglycol; 2,2-diethylpropane-1, 3-diol; 2-methyl-2-propylpropane-1,3-diol; 2,2,4-trimethylpentane-1,3-diol; decamethylene glycol; dodecamethylene glycol; monoethyl ether of glycerine; alpha,beta-allyl ethers of glycerol, and the like.

The dicarboxylic acids utilized in preparing the polyesters can be aliphatic, cycloaliphatic, both saturated and unsaturated or aromatic. Suitable dicarboxylic acids include: malonic, succinic, glutaric, adipic, pimelic, suberic, azelaic, sebacic, brassylic, maleic, fumaric, tetrahydrophthalic, dilinoleic, diphenic, tetrachlorophthalic, isophthalic, terephthalic, orthophthalic acids, cyclohexane 1,2-dicarboxylic acid, p-phenylene diacetic acid, naphthalene dicarboxylic acids, dihydromuconic acid, beta-methyl adipic acid, trimethyl adipic acid, ethylether-2,2'-dicarboxylic acid, and the like.

If desired, one can use anhydrides of the above dicarboxylic acids such as phthalic anhydride, tetrahydrophthalic anhydride and the like. If desired, one can also use acid chlorides of the above dicarboxylic acids. If desired, one can also use mono-carboxylic acids to cap the polyester chain. Among such acids are included fatty acids and aliphatic and aromatic mono-acids.

Among the polyethers are included polyethylene glycol and polypropylene glycol.

Naturally occurring polymers such as the cellulosics and their derivatives can also be utilized in this invention.

Among preferred polymers are addition polymers containing at least two hydroxyl groups per polymer chain, e.g., butyl acrylate/styrene/acrylic acid/hydroxyethyl acrylate, containing 8% by weight of hydroxyethyl acrylate and having a weight average molecular weight (GPC) of approximately 20,000.

Often, reformulation of polymeric systems to meet air pollution control regulations requires the use of polar solvents with a concomittant drop in electrical resistivity in the presence of acid catalysts. Utilization of blocked acid catalyst can help minimize this problem where the coatings are applied by electrostatic spraying.

Other preferred polymers are described in a pending U.S. application, filed on the same day with the present application, Ser. No. 704,366, filed July 12, 1976, to J. A. Antonelli, hereby incorporated by reference. The polymers described therein comprise a blend of low molecular weight hydroxy-terminated polyesters based on 2,2,4-trimethyl-1,3-pentane diol (TMPD) as the diol component. To obtain the two polyester components of the blend, TMPD is reacted separately with iso-phthalic acid (IPA) or its esters such as dimethyl iso-phthalate, other phthalic acids and their esters, maleic acid and its esters or tetrahydrophthalic acid, its anhydride or esters, cyclohexane-1,2-dicarboxylic acid, its anhydride or esters, and the isomeric naphthalene dicarboxylic acids, their esters or anhydrides and with an aliphatic dicarboxylic acid, its esters or mixtures thereof. The aliphatic dicarboxylic acid is of the general formula HOOC$+$CH$_{2\overline{m}}$COOH, where m is generally 2-4, although m=1 or 5-12 is also possible. In one preferred composition, a mixture of dicarboxylic acids or their esters is utilized, the mixture containing succinic, glutaric, and adipic acids. The choice of a specific ratio of aliphatic esters can depend on the final polyester property desired, such as flexibility or softness. In one preferred composition this ratio is 1:2:1 by weight.

Still other preferred polymers are polyesters based on neopentyl glycol or 1,3-butylene glycol such as poly(neopentyl glycol maleate) and poly(1,3-butylene terephthalate). An electrostatically sprayable composition of this invention, based on the latter polyester, can be cured at a temperature as low as 120° C. (Knoop Hardness 18.1 after 30 minutes) when catalyzed with propylene oxide blocked PTSA.

The polymeric component containing the functional groups is present in an amount of 30-90 parts by weight of the film formers and preferably 50-80 parts. In an especially preferred formulation, 65 parts of functional polymer, a polyester, is present.

The other film-forming constituent of the thermosetting liquid coating composition is a nitrogen resin crosslinking agent.

The nitrogen resin crosslinking agents are well known in the art. They are the alkylated products of amino resins, the latter prepared by the condensations of at least one aldehyde with at least one of urea, N,N'-ethyleneurea, dicyandiamide, and aminotriazines such as melamines and guanamines. Among the aldehydes that are suitable are formaldehyde, revertable polymers thereof such as paraformaldehyde, acetaldehyde, crotonaldehyde, and acrolein. Preferred are formaldehyde and revertable polymers thereof. The amino-resins are alkylated with at least one and up to six alkanol molecules containing 1 to 6 carbon atoms. The alkanols can be straight chain, branched, cyclic or mixtures thereof. Among preferred members of this class are the methylated melamine-formaldehyde resins such as hexamethoxymethylmelamine and mixed peralkoxy derivatives. These liquid crosslinking agents have substantially 100% nonvolatile content as measured by the foil method at 45° C. for 45 minutes. For the purposes of this invention it is important not to introduce extraneous diluents that would lower the final solids content of the coating. The hexamethoxymethylmelamines also offer fast rates and high efficiency of cure and result in coatings of high gloss and excellent chemical and stain resistance.

Utilization of the peralkoxymethylated melamines is also preferred over the partially reacted melamines because the rate of reaction of, for example, the hexamethoxymethylmelamine with polymers containing reactive functional groups, as for example hydroxyl groups, is approximately 20 times as fast as the self-condensation reaction. With partially alkoxymethylated melamines and melamine-formaldehyde the rate of self-condensation is of the same order of magnitude as the rate of crosslinking with the polymer. If significant portions of the crosslinking resin were to be consumed through self-condensation, then significant portions of the polymer would remain uncross-linked.

The nitrogen resin crosslinking agent is present in an amount of 10-70 parts by weight of the film formers and preferably 20-50 parts. In an especially preferred composition, 35 parts of crosslinker is present.

The blocked acid catalyst utilized in the thermosetting liquid coating composition of this invention is present in sufficient amounts to contain 0.05-2 parts, by weight of the composition, of potentially available sulfonic acid when the unblocking takes place.

Utilization of blocked acid catalyst in the composition of this invention unexpectedly serves a dual function at least. It is known that temporary deactivation of an acid catalyst can occur by reacting the catalyst, such as para-toluene sulfonic acid (PTSA) or other sulfonic acids, with appropriate acceptor molecules, such as materials containing oxirane functionality, to form a blocked acid catalyst. Such blocked catalysts can be unblocked, usually through heating, to provide the free acid. While in the blocked state, however, the catalyst is much less active than the free acid catalyst in promoting the reaction between a functional polymer and a nitrogen resin cross-linking agent and therefore the compositions have improved storage stability.

It has been found unexpectedly, however, that when the blocked acid catalyst is utilized in the thermosetting composition of this invention, the electrical resistivity of the composition is not adversely affected. This can be seen from the following:

In attempting to increase the rate of curing, it is common practice to either carry out the curing process at increased temperatures or to add increased amounts of catalyst to the thermosetting system. Often, when increased temperatures are impractical or deterimental to a system, one is left with the latter choice. However, the addition of increased amounts of, e.g., PTSA to, e.g., a hydroxy-terminated polyester/nitrogen resin crosslinking agent system, can diminish the resistivity of the system below acceptable levels for electrostatic spray application.

The Table below shows the effect of increased PTSA levels on resistivity as measured by a Ransburg Resistivity Meter having a pre-set gap between the electrodes and thereby providing relative resistivity values in megaohms. A pigmented coating composition utilized in this test is based on a polyester blend containing a polyester prepared from TMPD and IPA and a polyester prepared from TMPD and dimethyl aliphatic carboxylates (succinate: glutarate: adipate in a 1:2:1 approximate weight ratio), in a weight ratio of approximately 1:4, and hexamethoxymethylmelamine, in a weight ratio of polyesters:crosslinker of approximately 2:1; measurements are at 25° C.:

| Catalyst Level (%) | Relative Resistivity (Megaohm) |
| --- | --- |
| 0 | 10 |
| 0.20 | 3.8 |
| 0.25 | 1.9 |
| 0.30 | 1.75 |
| 0.35 | 1.4 |
| 0.40 | 1.2 |

As can be seen from the detailed description in Examples I and II, inclusion of sufficient blocked catalyst, to have 0.5 part potentially available PTSA upon unblocking, affords a thermosetting composition having 3.2 megaohm resistivity. A comparable system containing 0.5 part free PTSA has a resistivity of 0.6 megaohm, below the practically useful range for some electrostatic spray applications. Although the minimum acceptable level of resistivity is approximately 0.5 megaohm, for most practical applications a resistivity of at least approximately 1 megaohm is preferred in most coating compositions. Most preferred resistivity levels are approximately 1.5–3.5 megaohms.

The blocked acid catalyst utilized in the liquid thermosetting composition of this invention is prepared from materials containing at least one oxirane functionality and a sulfonic acid, sulfinic acid or phosphoric acid or its esters. It is preferred, that the oxirane containing material be added to the acid, however, the reverse order is also practical. The ratio of Å/SO₃H is at least one, preferably 1–4. The blocked acid catalyst is believed to arise through the following reaction with a sulfonic acid:

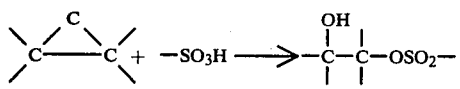

Suitable oxirane containing materials include, among others, the low molecular weight epoxides such as ethylene oxide, propylene oxide, 1,2-butylene oxide, 2,3-butylene oxide, and the like; glycidyl esters of carboxylic acids; copolymers of glycidyl methacrylate; and epoxy resins. The epoxy resins which can be utilized in the present invention are commonly known in the art. One class of such resins has the generalized formula

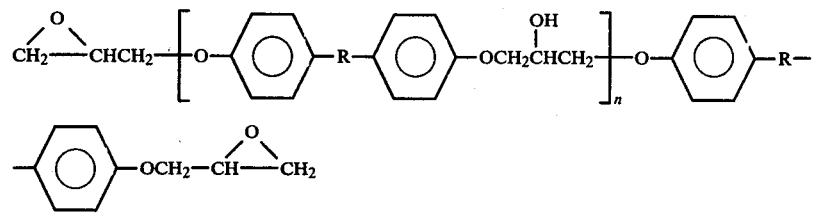

where for purposes described above n is an integer usually from 0–6 and R is an alkylene group of 1–4 carbon atoms.

One preferred epoxy resin is "Epon 826" where the average value of n is 0, R is isopropylidene, the viscosity of the undiluted resin is 65–95 poises at 25° C. as measured by ASTM-D-445, and has an epoxy equivalent of 180–188. The epoxy equivalent is defined as the grams of resin containing 1 gram-equivalent of epoxide as measured by ASTM-D-1652. Another preferred epoxy resin is "Epon 1001" whose average n value is between two and three, R is isopropylidene, has a melting point of 65°–75° C., and an epoxy equivalent of 450–550. Still another preferred epoxy resin to be utilized in preparing a blocked acid catalyst is "Epon" 1004 which is similar to "Epon" 1001, has a melting point of 95°–105° C. and an epoxy equivalent of 875–1000.

Another preferred epoxy resin, for reaction with PTSA, has the following structure:

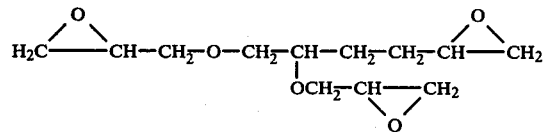

Among useful sulfonic acids, for the preparation of blocked acid catalysts, are included para-toluene sulfonic acid, methane sulfonic acid, alkylbenzene sulfonic acids wherein the alkyl group contains 2–12 carbon atoms, and 2-methacryloxyethyl sulfonic acid, its homo- and copolymers, and the like.

The coating composition of this invention can be cured thermally. During the heating process, the blocked acid catalyst undergoes an unblocking reaction to generate an acid catalyst and consequently the ultimate cure obtainable, as indicated by hardness measurements, is substantially the same for the blocked catalyst systems as for those containing a free acid catalyst.

The temperature required for the unblocking reaction varies with the nature of the blocked acid catalyst and therefore the temperature utilized during the curing of the coating composition can vary widely. Usually temperatures between 125°–180° C. and preferably between 150°–175° C. are utilized. The length of time of curing can also vary but 20–30 minutes usually afford well cured coatings.

The data below show the different unblocking temperatures needed for various blocked acid catalysts; the comparison to coating compositions containing free PTSA indicates that only slightly higher curing temperatures are necessitated by the use of blocked acid catalysts.

Hardness of Coatings* at Different Curing Temperatures

| Catalyst Blocking Agent | Knoop Hardness No. After 30 min., at °C. | | | | | |
|---|---|---|---|---|---|---|
| | 102 | 118 | 134 | 138 | 147 | 163 |
| — | 7.9 | 21.9 | 24.2 | — | 24.8 | 27.2 |
| ethylene oxide | 0 | 0 | 4.3 | 15.8 | 22.9 | 25.6 |
| propylene oxide | 0 | 0 | 17.6 | 20.2 | 23.5 | 26.7 |
| 2,3-butylene oxide | 0 | 0 | 19.8 | 21.3 | 23.9 | 26.5 |

*Based on a blend of polyesters (prepared from 2,2,4-trimethylpentane-1,3-diol-/isophthalic acid and 2,2,4-trimethylpentane-1,3-diol/dimethyl esters of succinic, glutaric, and adipic acids) and hexamethoxymethylmelamine; containing 0.7%, by weight of the coating, of available catlayst.

Appropriate selection of the functional polymer, e.g., a polyester based on dimethyl terephthalate and 1,3-butylene glycol, and of a blocked catalyst, e.g., PTSA blocked with propylene oxide, can afford electrostatically sprayable, storage stable coating compositions which are curable at temperatures as low as 120° C.

The coating composition of this invention can contain, in addition to a functional group-containing polymer and a crosslinking agent, other components to enhance various properties of the composition or the final coating therefrom, such as pigments, pigment stabilizers, rheology control agents, for example acrylic polymers, cellulosics, finely divided fumed silicas, dispersants, adhesion promoting agents, e.g. epoxy resins, colorants, and the like.

The coating compositions of this invention are designed for application to metallic substrates, such as steel and aluminum and can be applied with or without the presence of a primer. They can also be applied to other suitably treated substrates such as cellulosics, leather, ceramics, glass, and plastics. They can be applied by any conventional method of application such as spray-, dip-, roll-or brush-coating or by electrostatic methods. In this latter case, high resistivity of the coating composition is an important factor, as discussed above.

The coating composition of this invention are useful as general industrial coatings, for example in the appliance industry, and provide coatings having excellent solvent and stain resistance, resistance to weathering and corrosive conditions, forward and reverse impact, hardness, high gloss, etc.

In the following Examples, illustrating the invention, all parts are by weight unless otherwise indicated.

EXAMPLE I

A. Preparation of Blocked Acid Catalyst

Epoxy resin, having an epoxy equivalent of 875–1000 and a Gardner-Holdt viscosity of a 40% solution in butyl dioxitol at 25° C. of Q-U, 1800 g, is dissolved in a mixture of 600 g of xylene and 600 g of methyl ethyl ketone.

To 625 g of this solution is added, with stirring, 86 g of a 40% PTSA solution in isopropanol. An exothermic reaction ensues which subsides in 2 min. Mixing is continued for 6 hr. to reach a constant acid number of 6.9.

B. Preparation of Pigment Dispersion

A pigment dispersion is prepared from the following ingredients, by sand milling:

| | |
|---|---|
| Hexamethoxymethylmelamine | 463.0 g. |
| Acrylic rheology control agent, at 60% solids, composition: butyl acrylate/styrene/hydroxyethyl acrylate/acrylic acid//38/50/8/4, solvent composition:cellosolve acetate/n-butanol/aliphatic hydrocarbon//61/8/31 | 234.9 g. |
| Dispersant, at 48% solids, an isocyanate-modified methyl methacrylate/2-ethylhexyl acrylate//63/37 polymer, capped with mercaptosuccinic acid: described in Canadian Patent 968,092, Example I | 9.1 g. |
| Amyl acetate | 279.5 g. |
| TiO$_2$ (rutile) | 2013.4 g. |

C. Preparation of Coating Composition

A coating composition is prepared by mixing together the following:

| | |
|---|---|
| Pigment dispersion, from B above | 850.8 g. |
| Polyester blend, prepared below | 352.8 g. |
| Hexamethoxymethylmelamine | 40.0 g. |
| Epoxy resin solution, from A above | 52.0 g. |
| Blocked acid catalyst, from A above | 59.0 g. |

The above polyester blend is prepared by first forming polyester A and then polyester B and then by blending polyesters A and B together in a 2:1 ratio.

Preparation of a Polyester A from 2,2,4-Trimethylpentane-1,3-diol and Isophthalic acid Into a five liter three-necked flask equipped with stirrer, thermometer, a packed column, condenser, and a Dean-Stark trap are placed TMPD, 1839. 6 g; isophthalic acid, 996.0 g; toluene, 54.0 g; and dibutylin dilaurate, 3.0 g. The contents of the flask are heated to a maximum temperature of 208° C. for a total of eleven hours during which time a water-toluene azeotrope is collected to remove the theoretical amount of water. The final product has a solids content of 98% in toluene, a viscosity of 32,750 centipoises, measured on a Brookfield viscometer, and an acid number of 5.4.

Preparation of a Polyester B from 2,2,4-Trimethylpentane-1,3-diol and a Mixture of Dimethyl aliphatic carboxylates Into an apparatus described in A above are charged TMPD, 1839.6 g; a mixture of dimethyl succinate, dimethyl glutarate, and dimethyl adipate, in a weight ratio of 1:2:1, 972.0 g; and dibutyltin dilaurate, 3 g. The contents of the vessel are heated to a maximum of 202° C. for a total of nine hours during which time the theoretical amount of methanol is collected. The final product has a Gardner-Holdt viscosity of Q and a hydroxyl number of 213.

The coating composition has an initial resistivity of 3.2 megaohms and 2.3 megaohms after standing at 49° C. for 20 days. Initial Brookfield viscosity, measured with #2 spindle at 2 rpm, is 800 centipoises; viscosity after 12 days at 49° C. is 1060 cps and after 20 days it is 1320 cps. The high resistivity values and small viscosity rise on standing demonstrate the advantages of this invention over PTSA-catalyzed compositions, see Example II.

EXAMPLE II

Control

Example IC is repeated by substituting 7.1 g of a 40% PTSA solution in isopropanol for the blocked acid catalyst. These two Examples utilize equivalent amounts of acid catalyst.

The coating composition has an initial resistivity of 0.6 megaohms and 0.5 megaohms after standing at 49° C. for 20 days. Initial Brookfield viscosity, measured with #2 spindle at 2 rpm, is 750 cps; viscosity after 12 days at 49° C. is 1804 cps and after 20 days it is 2200 cps.

This viscosity rise is unacceptable for most applications and the resistivity of the composition is at or near the minimum acceptable level for electrostatic spraying.

EXAMPLE III

A. Preparation of Cured Films from Composition of Example IC

The composition is sprayed on cold rolled steel panels treated with iron phosphate and cured for 30 min. at 150° and 177° C., respectively. From the Table below it can be seen that the composition of this invention is more thermally stable than, but is curable to the same extent as, compositions which are catalyzed with PTSA.

B. Preparation of Cured Films with the Control Composition of Example II

The procedure of A above is repeated with the control composition containing PTSA. Comparative hardness data, corresponding to cure levels, are shown in the Table below:

|  | Curing Conditions | | | |
|---|---|---|---|---|
|  | 150° C./30 min. | | 177° C./30 min. | |
| Hardness | Ex. IIIA | Ex. IIIB | Ex. IIIA | Ex. IIIB |
| Pencil | HB | 6H | 6H | 6H |
| Tukon | 1.37 | 16.47 | 18.91 | 19.82 |

What is claimed:

1. A thermosetting liquid electrostatically sprayable composition consisting essentially of:
   (A) film forming constituents consisting essentially of:
   (1) 50–80 parts, by weight of the film formers, of an ester blend consisting essentially of:
   (a) 40–80 parts by weight, based on the weight of the blend, of a polyester of the following structure:

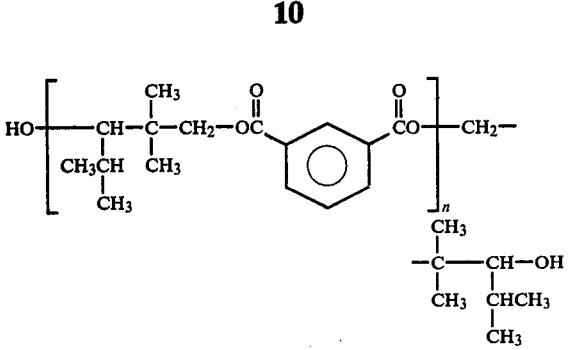

its isomer through the secondary hydroxyl group of mixtures thereof, wherein $n=0$–$10$ and at least 65% by weight is $n=3$ or less; and
   (b) 60–20 parts by weight, based on the weight of the blend, of a polyester of the following structure:

its isomer through the secondary hydroxyl group or mixtures thereof, wherein $n=0$–$10$ and at least 65% by weight is $n=3$ or less and wherein $m=2$–$4$; and
   (2) 50–20 parts, by weight of the film formers, of peralkoxymethylmelamine; and
   (B) sufficient blocked acid catalyst to contain 0.05–2 parts, by weight of the film formers, of potentially available sulfonic acid, wherein the blocked catalyst is the reaction product of a material containing at least one oxirane functionality and a sulfonic acid is an equivalent ratio of at least one; and
wherein the composition has a resistivity of at least 1 megohm and up to 3.5 megohms.

2. The composition of claim 1 having a resistivity of about 1.5–3.5 megohms.

3. The composition of claim 1 wherein the oxirane containing material is selected from the group consisting of ethylene oxide, propylene oxide, 1,2-butylene oxide, 2,3-butylene oxide, an epoxy resins and the sulfonic acid is selected from the group consisting of methane sulfonic acid, para-toluene sulfonic acid, alkyl benzene sulfonic acid wherein the alkyl group contains 2–12 carbon atoms, and 2-methacryloxyethyl sulfonic acid, its homopolymers and copolymers.

4. The composition of claim 3 wherein said polyester blend contains 65 parts, by weight of the blend, of the polyester component (a) and 35 parts, by weight of the blend, of the polyester component (b).

* * * * *